United States Patent
Byrne et al.

(10) Patent No.: US 10,255,364 B2
(45) Date of Patent: *Apr. 9, 2019

(54) ANALYZING A QUERY AND PROVISIONING DATA TO ANALYTICS

(71) Applicant: International Business Machines Corporation, Armonk, NY (US)

(72) Inventors: Brian P. Byrne, Austin, TX (US); Ivan M. Milman, Austin, TX (US); Martin Oberhofer, Bondorf (DE); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 907 days.

This patent is subject to a terminal disclaimer.

(21) Appl. No.: 14/551,178

(22) Filed: Nov. 24, 2014

(65) Prior Publication Data

US 2015/0286693 A1 Oct. 8, 2015

Related U.S. Application Data

(63) Continuation of application No. 14/247,366, filed on Apr. 8, 2014, now Pat. No. 9,633,115.

(51) Int. Cl.
*G06F 17/30* (2006.01)
*G06Q 50/00* (2012.01)
*G06Q 10/06* (2012.01)

(52) U.S. Cl.
CPC .. *G06F 17/30864* (2013.01); *G06F 17/30637* (2013.01); *G06F 17/30654* (2013.01);
(Continued)

(58) Field of Classification Search
CPC ......... G06F 17/30637; G06F 17/30654; G06F 17/30997; G06F 17/30699;
(Continued)

(56) References Cited

U.S. PATENT DOCUMENTS

| | | | | |
|---|---|---|---|---|
| 6,785,869 B1 * | 8/2004 | Berstis | ................. | G06F 17/241 707/E17.005 |
| 7,296,229 B2 * | 11/2007 | Berstis | ................. | G06F 17/241 704/10 |

(Continued)

OTHER PUBLICATIONS

Anonymous, "Populate Glossary Content for Business Intelligence Reports," An IP.com Prior Art Database Technical Disclosure, IP.com No. IPCOM000200980D, Electronic Publication Date Nov. 2, 2010, 10 pages.

(Continued)

*Primary Examiner* — Albert M Phillips, III
(74) *Attorney, Agent, or Firm* — Nathan M. Rau

(57) ABSTRACT

A user interface is generated that displays a set of selectable terms from a glossary of business terms and is configured to generate a business metadata query that identifies a forum with member profiles. A data movement executable is generated that identifies the forum and an analytical processing environment. The data movement executable is deployed and data is moved from the forum into the analytical processing environment. Analytics are performed on the data from the forum. Metadata is identified from the analytics. The glossary of business terms is updated using the metadata from the analytics.

7 Claims, 5 Drawing Sheets

(52) U.S. Cl.
CPC .. *G06F 17/30663* (2013.01); *G06F 17/30699* (2013.01); *G06F 17/30997* (2013.01); *G06Q 10/06* (2013.01); *G06Q 50/01* (2013.01)

(58) Field of Classification Search
CPC ........ G06F 17/30864; G06F 17/30663; G06Q 50/01; G06Q 10/06
See application file for complete search history.

(56) References Cited

U.S. PATENT DOCUMENTS

| | | | | |
|---|---|---|---|---|
| 8,401,993 | B2* | 3/2013 | Kumar | G06Q 10/10 705/7.11 |
| 9,251,530 | B1 | 2/2016 | Dachis et al. | |
| 2005/0192934 | A1* | 9/2005 | Ellis | G06F 17/30017 |
| 2007/0112748 | A1* | 5/2007 | Angell | G06F 17/27 |
| 2010/0250574 | A1 | 9/2010 | Dettinger et al. | |
| 2011/0196719 | A1* | 8/2011 | Bhandari | G06Q 10/00 705/7.39 |
| 2012/0115449 | A1* | 5/2012 | Bruchelt | H04M 1/575 455/415 |
| 2012/0150792 | A1 | 6/2012 | Yassin et al. | |
| 2012/0173522 | A1* | 7/2012 | Girsig | G06Q 10/10 707/736 |
| 2013/0007607 | A1* | 1/2013 | Caldwell | G06F 17/2735 715/259 |
| 2013/0013552 | A1* | 1/2013 | Eshleman | G06Q 10/00 707/600 |
| 2013/0086101 | A1* | 4/2013 | Heidasch | G06F 17/30528 707/769 |
| 2013/0159306 | A1 | 6/2013 | Janssen, Jr. et al. | |

OTHER PUBLICATIONS

Duhigg, C., "How Companies Learn Your Secrets", The New York Times, Magazine, Feb. 16, 2012, (Printed Mar. 11, 2013). www.nytimes.com/2012/02/19/magazine/shopping-habits.html?pagewanted=all&_r=0.

Sheina, M., "Big Data integration is the big deal in Informatica 9.1", Ovum.com, Jun. 19, 2011, © Ovum 2014. http://ovum.com/2011/06/19/big-data-integration-is-the-big-deal-in-informatica-9-1/.

Byrne, et al., "Analyzing a Query and Provisioning Data to Analytics," U.S. Appl. No. 14/247,366, filed Apr. 8, 2014.

List of IBM Patents or Patent Applications Treated as Related, Nov. 21, 2014, 2 pages.

* cited by examiner

ANALYZING A QUERY AND PROVISIONING DATA TO ANALYTICS

BACKGROUND

This disclosure relates generally to metadata, and more specifically, regards using metadata to refine business term definitions and create new business terms.

Enterprises rely on vast amounts and diverse types of data for their operation—personnel data, financial data, accounting data, inventory data, capital equipment data, document management data, and more. Today, data is generally stored according to data structures referred to as a data schemas, such as XML and relational database schemas. The term "metadata" is used to denote data about the raw data itself, and about the structures of other Information Technology (IT) systems such as databases, applications, processes, middleware and hardware configurations.

SUMMARY

Embodiments of a method for analyzing a query and provisioning data to analytics. In various embodiments, the method may include generating a user interface. The user interface may display a set of selectable terms from a glossary of business terms and is configured to generate, in response to selection of the terms, a business metadata query that identifies at least one forum with a plurality of member profiles. The method may also include generating, from the business metadata query, at least one data movement executable that identifies the at least one forum and an analytical processing environment. Also, the method may include moving data from the at least one forum into the analytical processing environment by deploying the at least one data movement executable. In addition, the method may include performing, using the analytical processing environment, analytics on the data from the at least one forum. The method may also include identifying metadata from the analytics. Furthermore, the method may include updating the glossary of business terms using the metadata from the analytics.

Embodiments of a system for analyzing a query and provisioning data to analytics. In various embodiments, the system may include a user interface. The user interface may be configured to display a set of selectable terms from a glossary of business terms and is configured to generate, in response to selection of a subset of selectable terms, a business metadata query that identifies at least one forum with a plurality of member profiles. The system may also include a generator configured to generate at least one data movement executable from the business metadata query that identifies the at least one forum and an analytical processing environment. Also, the system may include a computing platform configured to deploy the at least one data movement executable to move data from the at least one forum into the analytical processing environment and perform, using the analytical processing environment, analytics on the data from the at least one forum. Furthermore, the system may include a business extender configured to identify metadata from the analytics, and configured to update the glossary of business terms using the metadata from the analytics.

Embodiments of a computer program product configured to analyze a query and provisioning data to analytics. In various embodiments, the computer program product may be configured to generate a user interface. The user interface may display a set of selectable terms from a glossary of business terms and that is configured to generate, in response to selection of the terms, a business metadata query that identifies at least one forum with a plurality of member profiles. The computer program product may also be configured to generate, from the business metadata query, at least one data movement executable that identifies the at least one forum and an analytical processing environment. Also, the computer program product may be configured to move data from the at least one forum into the analytical processing environment by deploying the at least one data movement executable. In addition, the computer program product may be configured to perform, using the analytical processing environment, analytics on the data from the at least one forum. The computer program product may also be configured to identify metadata from the analytics. Furthermore, the computer program product may also be configured to update the glossary of business terms using the metadata from the analytics.

The above summary is not intended to describe each illustrated embodiment or every implementation of the present disclosure.

Figure 1A:
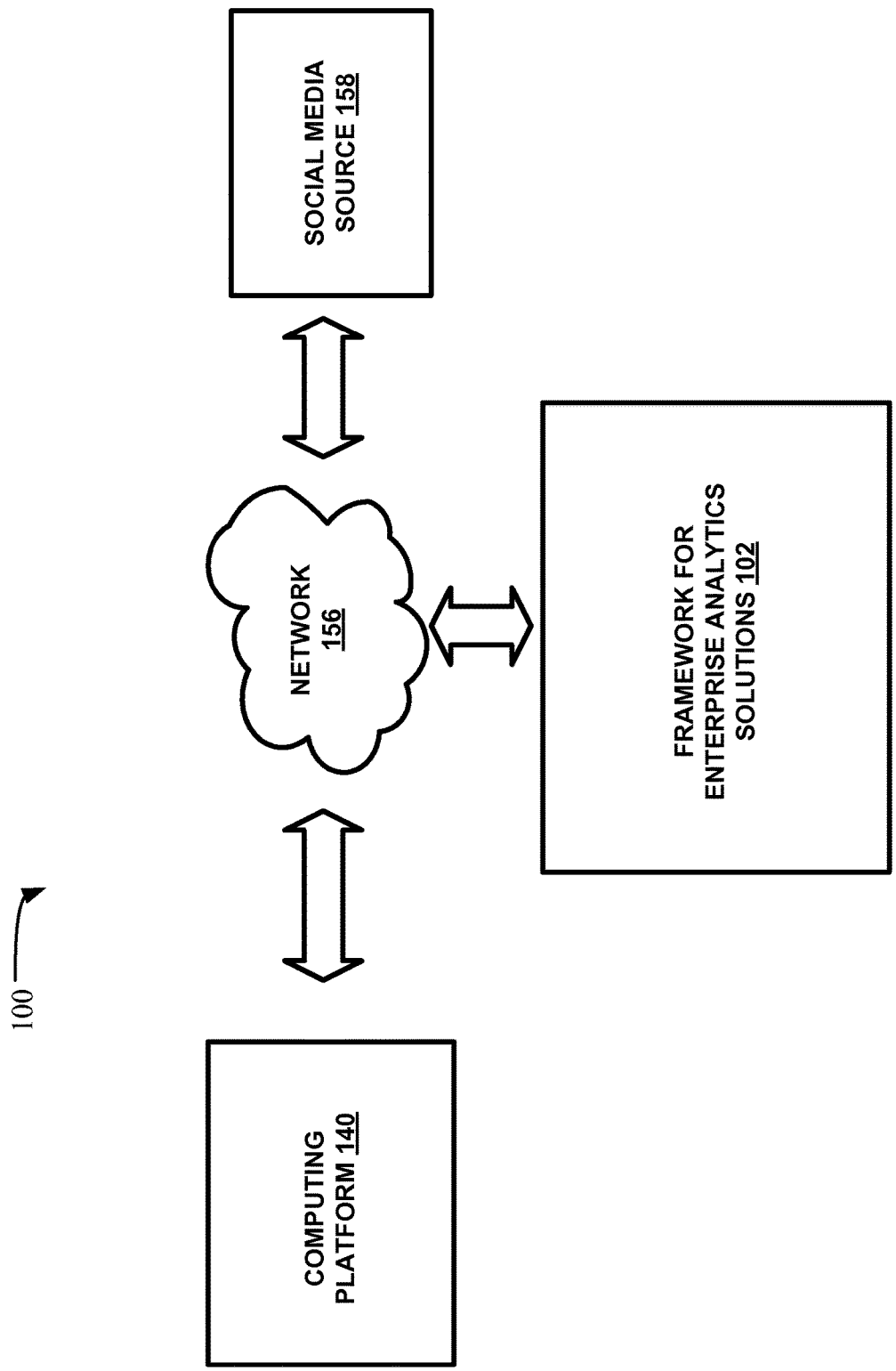
FIG. 1A depicts an enterprise computing infrastructure, consistent with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The success of an enterprise is directly related to its ability to make a profit. An enterprise that better understands its clients and customers is in a better position to make a profit. Enterprises collect data relating to their clients and customers. This data must be stored in an organized and documented manner so that it may be retrieved, analyzed, and the enterprise can obtain a better understanding of its clients and customers.

Information governance is the ability of an enterprise to maintain and manage its information knowledge. By practicing information governance, orchestrating people, processes, and technology ensures that information is understood, is of high quality, and is trusted. Metadata management is a central tenet to information governance. Metadata management is the practice of managing knowledge about the information supply chain. Although many people refer to metadata as "data about data," in reality, enterprises work with more than only data or information.

Metadata refers to a rich structure of knowledge. This structure captures the meaning of a term or data asset, its relationships to other assets, and rules that might apply to it to determine the quality, policies, and regulations that specify its use. Metadata management addresses many of the challenges that enterprises face in the present reality of a fast-moving world. Transactions execute in a fraction of a second, and decision making needs to match this speed. Trusted information in this world is invaluable, and the capability to trace and track the flow of data and access the information associated with it is critical.

The capability to easily and conveniently locate and retrieve information about data objects, their meaning, physical location, characteristics, and usage is powerful and beneficial to an enterprise. This capability enhances the ability of the enterprise to deal with risk, meet regulatory requirements, and improve IT productivity. Enterprises face a multitude of risk types of which market, operational, and regulatory exposure are only a few. Information and knowledge are ways that an enterprise can mitigate risk. The capability to make plans and decisions based on reliable and trusted information does not eliminate risk. However, with this ability, enterprises can more precisely evaluate the risk that they face and act accordingly. Metadata management provides a measure of trust that enterprises need. Through data lineage and impact analysis, enterprises can know the accuracy, completeness, and currency of the data used in their planning or decision making models.

Metadata has many sources, and many users find utility in various aspects of information about an object. Metadata may be classified into three categories: business metadata, technical metadata, and operational metadata.

Business metadata includes business terms and their definitions, examples of usage, business rules policies, and constraints. Altogether they define the semantics of a business concept and its realization in physical data assets. Users of business metadata are primarily business users, but anyone can use it to understand what things mean. Examples include how, when, and by whom they are used, and what policies, rules, and restrictions might apply to the use of the data asset. Business metadata may be expressed in a language that is spoken and understood by business people, which means spelling out terms fully and making sure that definitions are clear and unambiguous. Express business rules in plain language and not in a complex, formal manner with abbreviations, mathematical expressions, or functional expressions. Business metadata may be extended to add additional text or statement around a particular word that adds value to data. For example, when tables and columns are created, business metadata may be created that would help better define a business term or terms that would be more useful for generating reports to a functional and technical team.

Technical metadata consists of the technical description of data assets. Technical metadata includes the following descriptions: schemas, tables, and file layouts; source and target data store identification and physical attributes; data mappings; formal specifications of transformation jobs, business rules, and other processes. People and systems use technical metadata. IT technical staff, such as analysts, developers, and administrators, use technical metadata daily to perform jobs. For example, they might analyze requirements and write specifications for a new job, develop a method and write the code, or diagnose a problem and develop a fix for the problem. Knowledge of the data and the processes that manipulate the data is valuable to businesses. Technical metadata helps to understand: what databases exist; what are the schemas, tables, views, and columns in a database; what queries read from a table; if a column contains a null value; what do jobs write to a table; and what valid values are allowed for a column. Technical people create and use the technical metadata. Technical people often enhance the technical data manually when necessary to describe an addition of new data.

Operational metadata describes the events and processes that occur and the objects that are affected when an operation is ran. Furthermore, operational metadata is used to describe the results of various operations. During an operation, data such as start time, end time, CPU seconds used, disk reads, disk writes, rows processed, etc. are recorded.

Social media sources have become very important for individuals to create, share, and exchange information and ideas with one another. Social media sources may take several forms, such as internet forums, weblogs, social blogs, social networks, etc. In addition, social media source may refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. An online social media source may comprise a person's set of direct and/or indirect personal relationships, including real and virtual privileges and permissions that users may associate with these people. Direct personal relationships usually include relationships with people the user can communicate with directly, including family members, friends, colleagues, coworkers, and other people with which the person has had some form of direct contact, such as contact in person, by telephone, by email, by instant message, by letter, or the like. Moreover, the social media source 158 may include various profile information about a member, including, but not limited to the member's avatar, contact information, the member's preferences, degrees of separation between the member and another member, a membership in an activity, group, or the like. Social media information further may include various information about communications between the member and other members in the social network, including, but not limited to emails, blog posts, SMS messages, IM messages, Multimedia Message (MMS) messages, alerts, audio messages, phone calls, either received or sent by the member, or the like.

With reference now to the figures exemplary diagrams of data processing environments are provided in which illustrative embodiments may be implemented. It should be appreciated that the figures are only exemplary and are not intended to assert or imply any limitation with regard to the environments in which different embodiments may be implemented. Many modifications to the depicted environments may be made.

FIG. 1A depicts an enterprise computing infrastructure 100, consistent with embodiments of the present invention. As shown in FIG. 1A, the computing infrastructure 100 includes a framework for enterprise analytics solutions 102, computing platform 140, one or more social media sources 158, all connected by a network 156. In general, the network 156 may be several forms of data communications network, including a local and/or a wide area network (WAN) infrastructure used to connect data sources within an enterprise. In a particular embodiment, the network 156 includes data communications sent over the Internet.

The computing platform 140 may provide the capability of creating an analytical processing environment for executing analytics applications in business level languages. That is, using the terms and descriptions for information and applications customarily understood by a risk analyst or appropriate business level person, as opposed to the underlying data sources, databases, and application implementations used within a particular enterprise and understood by programmers, systems architects and data analysts.

Analytics is the discovery and communication of meaningful patterns in data. When combined with recorded data, analytics may use the application of statistics, computer programming and operations research to discover new information. Enterprises may use analytics to describe, predict, and improve business performance. For example, an enterprise may use analytics to improve decision management, retail, store assessment and stock-keeping, marketing, etc.

Figure 1B:
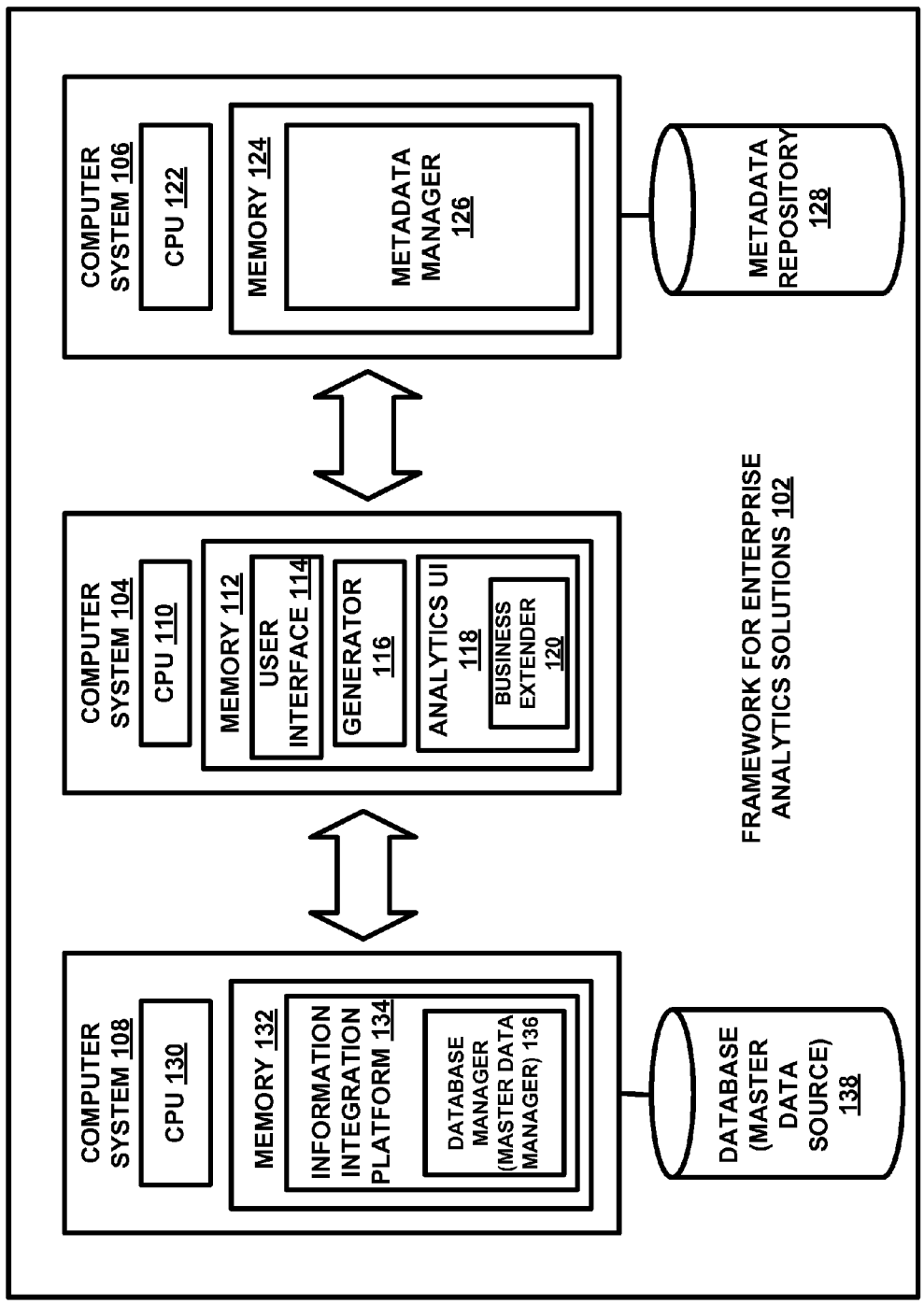
FIG. 1B depicts the framework for enterprise analytics solutions, from FIG. 1A, consistent with embodiments of the present invention.

FIG. 1B depicts the framework for enterprise analytics solutions 102, from FIG. 1A, consistent with embodiments of the present invention. Illustratively, the framework 102 is shown to include three computer systems 104, 106, and 108, each including a CPU 110, 122, 130, and memory 112, 124, 132. The computer systems 104, 106, 108 are included to be representative of a variety of computing devices, including stand alone server systems, virtualized systems, server blades or rack mounted servers, as well as virtual computing systems accessed through a cloud-based computing infrastructure, etc. In general, the computer systems 104, 106, and 108 are each under the control of an operating system (not shown). Well known examples of operating systems include UNIX, versions of the Microsoft Windows® operating system, and distributions of the Linux® operating system (Note: Linux is at trademark of Linus Torvalds in the United States and other countries.) Of course any operating system supporting the functions disclosed herein may be used.

The CPU's 110, 122, and 130 are included to be representative of a single CPU, multiple CPUs, a single CPU having multiple processing cores, and the like. The memories 112, 124, and 132 may include random access memories. While the memories 112, 124, and 132 are shown as single entities, it should be understood that the memories 112, 124, and 132 may comprise a plurality of modules, and that the memories 112, 124, and 132 may exist at multiple levels, from high speed registers and caches to lower speed but larger DRAM chips.

Figure 2:
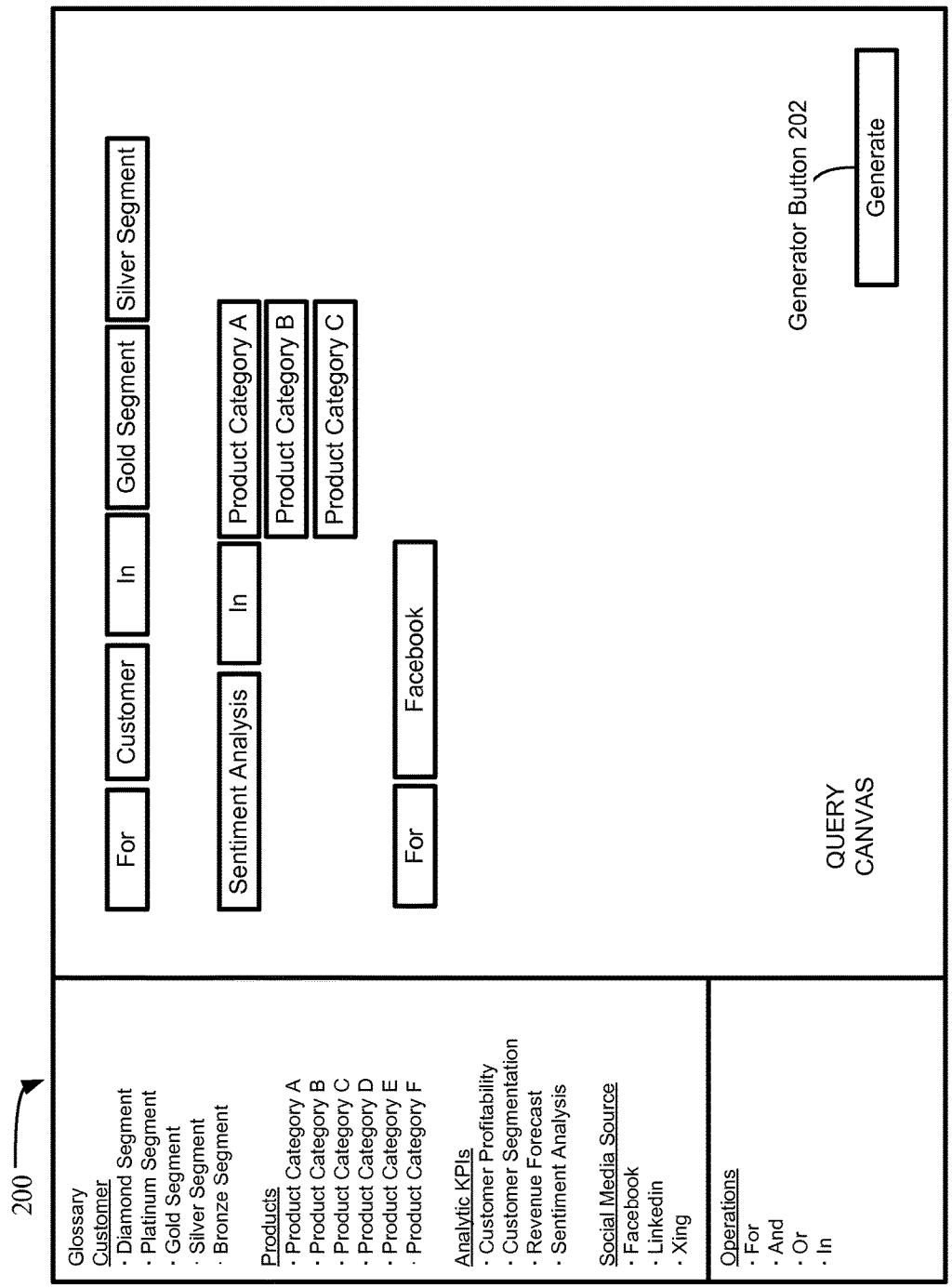
FIG. 2 depicts an example of a user interface for analyzing a query and provisioning data to analytics, consistent with embodiments of the present disclosure.
Figure 3:
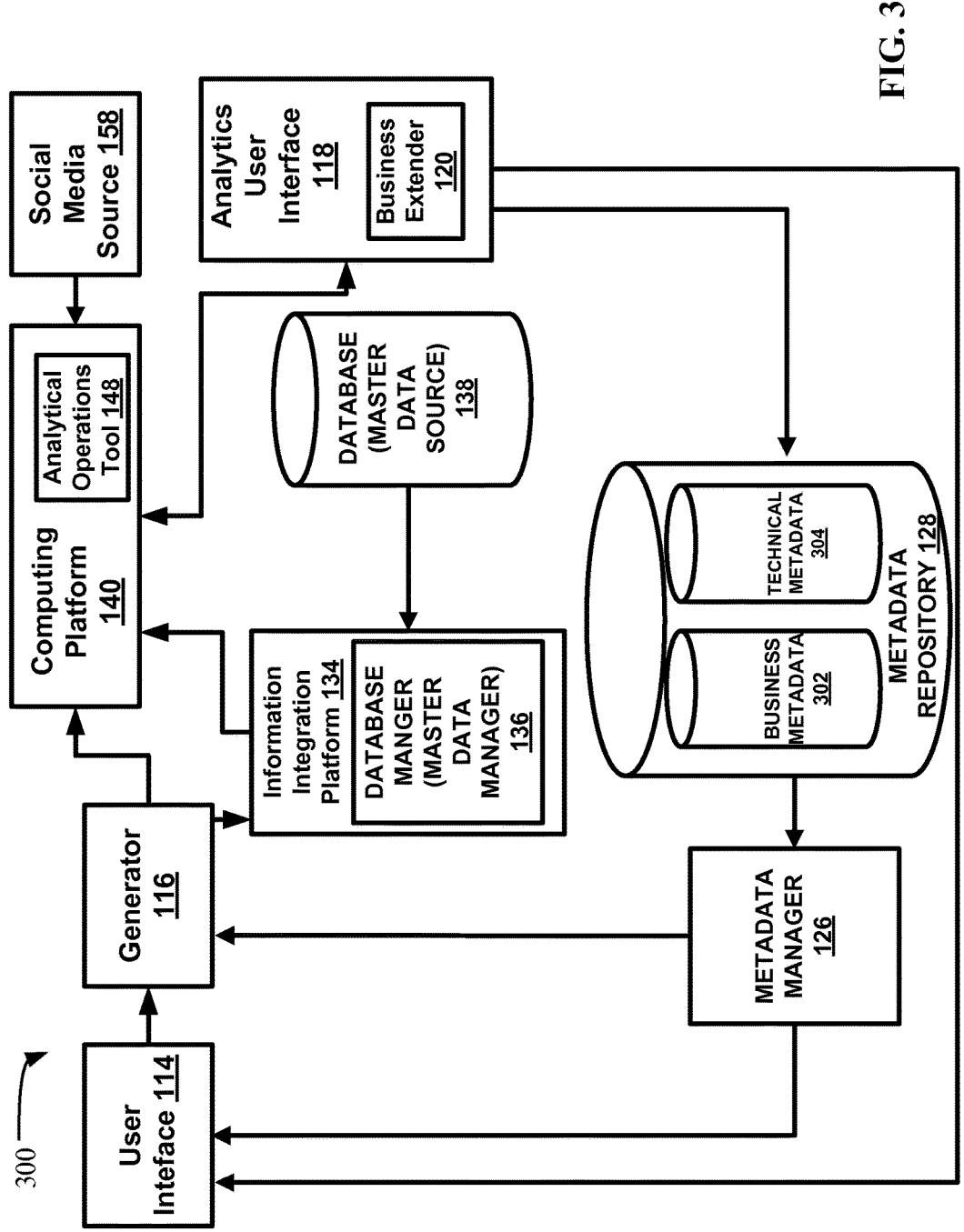
FIG. 3 depicts a system for analyzing a query and provisioning data to analytics, consistent with embodiments of the present disclosure.

Illustratively, the memory 112 is shown to include a user interface 114 and a generator 116 (described more fully in FIG. 3). The memory 112 is also shown to include analytics user interface 118 (described more fully in FIG. 2). Furthermore, the analytics user interface is shown to include a business extender 120 (described more fully in FIG. 2).

Illustratively, the memory 124 is shown to include a metadata manager 126. The metadata manager 126 may allow for the capability to collect metadata from across the framework for enterprise analytics solutions 102 and provide a map of the data flows within the framework 102. The metadata manager 126 may use the operational metadata to provide the control needed to manage change, reduce errors caused by change, and ensure data integrity. Furthermore, the metadata manager 126 may enable enterprises to define and annotate business metadata or business terms that describe their business environment, and link them to the underlying technical metadata, which provides a common vocabulary for the discussion of business terms and for business-IT collaboration.

The computer system 106 may control a metadata repository 128. The metadata repository 128 is populated by metadata. The metadata repository 128 provides metadata from various metadata sources in a consistent structure with meaningful connections and relationships between the metadata elements. Relationships between the sets of data are detected by the metadata manager 126. This detection includes detecting a number of relationship types based on programmatically or manually defined relationships. A metadata repository 128 structure is populated with the received technical metadata and business metadata and the relationships between the source data in a database 138 such that links are created between the technical and business metadata. These links may be based on defining relationship tables, the overall linking structure of the database, defining lookup tables and the like. The metadata manager 126 may write the metadata, the detected relationships, and the logically constructed relationships to the metadata repository 128. The metadata repository 128 provides the metadata about the metadata sources in a logical structure, with consistent metadata content and meaningful relationships between the metadata data elements so that it is available to other tools. Thus, the metadata repository 128 represents composite metadata. The metadata manager 126 enables the user to explore, search, and use the composite metadata.

Illustratively, the memory 132 is shown to include an information integration platform 134. Information integration platform 134 may allow for the combination of technical and business processes used to combine data from disparate sources into meaningful and valuable information. A complete data integration solution may encompass discovery, cleansing, monitoring, transforming and delivery of data from a variety of sources. The information integration platform 134 may enable the cleansing, monitoring, transforming and delivering of data, as well as bridging the gap between business and IT. State of the art platforms allow even self-service functions of data delivery for business users and an example of an information integration platform is the Data Click feature of IBM InfoSphere® Information Server. The information integration platform 134 may also provide the capabilities for delivering data in real time to business applications, whether through bulk (extract, transform, load (ETL)), virtual (federated) or incremental (change data capture) data delivery. Furthermore, information integration may be a collection of technologies that combines database management systems, Web services, replication, federated systems, and warehousing functions into a common platform.

The information integration platform 134 is shown to include a database manager 136. An example of a database manager 136 is a master data manager; however, other database managers may be used. A database manager 136 may be capable of performing several kinds of operations a database 138 for either manipulation of the data in the database 138 or the management of the database 138 itself. Database managers are categorized according to their data structures or types. Master data managers encompass the business processes and the technical and data integration architecture to create and consistently maintain a "system of record" for core business entities shared across disparate applications in the enterprise. Thus, master data is defined as the facts that describe, for example the following core business entities: Customers; Suppliers; Partners; Products; Materials; Bill of materials; Parts; Chart of accounts; Locations; and Employees, etc. Therefore, the database manager 136 consistently defines and manages the operational business data entities of an entity.

Illustratively, the database 138 represents the source data of any available data source from the enterprise computing infrastructure 100. For example, the database 138 may include multiple relational data repositories and operational data stores, master data, structured and unstructured data sources (e.g., document collections), external relational or structured sources, internal and external sources of unstructured and semi-structured information, real time sources such as external market data feeds or internal sources such as application and information technology infrastructure event monitoring, etc.

FIG. 2 depicts an example of a user interface 200 for analyzing a query and provisioning data to analytics, consistent with embodiments of the present disclosure. Using the user interface 200, the user may define the scope and the type of input data as well as the social media sources for which the social media analysis should run. The user interface 200 is shown to include a glossary. The glossary is shown to include business terms. The business terms may be displayed by the user interface and defined by business metadata located in the metadata repository 128, from FIG. 1B (discussed further in FIG. 3). In an embodiment, the user interface 114, from FIG. 1B, may be the same as the user interface 200.

The user interface 200 may allow a user to drag business terms from the glossary and drop them on to the query canvas of the user interface 200. In an embodiment, as shown in FIG. 2, the gold segment and silver segment business terms have been dragged from the glossary and dropped on to the query canvas of the user interface. The glossary may also have a list of analytical operations and social media sources the user may drag and drop. The listed analytical operations, for example, may be operations included in an analytical operations tool and the listed social media sources may be the social media sources 158, from FIG. 1A, connected by the network 156, from FIG. 1A. In an embodiment, as shown in FIG. 2, the sentiment analysis analytical operation has been dragged from the glossary and dropped on the query canvas. Furthermore, the social media source Facebook, has been dragged from an exemplary list of social media sources in the glossary and dropped on to the query canvas.

As shown in FIG. 2, the user interface 200 may also have linking terms, located in a linking-term word bank. A user may drag and drop linking-terms to select how the business terms, analytical operations, and social media sources from the glossary should be tied together. In an embodiment, as shown in FIG. 2, the linking-terms "For" and "In" have been dragged from the linking-terms word bank and dropped on the query canvas. Furthermore, the user interface is shown to contain a generator button 202. The generator button 202 may be used to initiate the generator 116, from FIG. 1B (discussed further in FIG. 3).

FIG. 3 depicts a system 300 for analyzing a query and provisioning data to analytics, consistent with embodiments of the present disclosure. The system may include the user interface 114, the generator 116, the metadata manager 126, the metadata repository 128, the database 138, the information integration platform 134, the computing platform 140, one or more social media sources 158, and the analytics user interface 118.

Illustratively, the user interface 114 may resemble user interface 200. By selecting business terms, analytical operations, social media sources, and selecting linking-terms to link them, the user interface 114 may allow a user to determine the scope of a query. The business terms may be defined by business metadata located in the business metadata repository 302. The metadata manager 126 may transfer the business metadata from the business metadata repository 302 to the user interface 114 based upon the selected business terms.

Consistent with certain embodiments, after the business terms, analytical operations, social media sources, and linking-terms have been selected, the user may generate a business query by clicking the generator button 202, from FIG. 2 and initiate the generator 116. The generator 116 may communicate with the metadata manager 126 that a query is made. The metadata manager 126 may take the business metadata that was selected and translate the business metadata into its technical metadata counterpart, located in the technical metadata repository 304. The metadata manager 126 may then transfer the technical metadata back to the generator 116.

Illustratively, the generator 116 may transfer the technical metadata to the information integration platform 134. As shown in FIG. 3, the information integration platform contains a database manager 136. The database manager 136 may use the technical metadata to retrieve master data from the database 138, onto the information integration platform 134. The information integration platform 134 may then transfer the master data to the computing platform 140.

In various embodiments, the generator 116 may transfer the selected analytical operations and social media source to the computing platform 140. The computing platform may communicate with the selected social media source 158 via the network 156, from FIG. 1A, and use the extracted master data to determine and extract the correct member profiles from the social media source 158.

As shown in FIG. 3, the computing platform contains an analytical operations tool 148. The analytical operations tool 148, running on the computing platform 140, may perform the analytical operations that were selected on the member profiles. The computing platform 140 may then transfer the results of the analytical operations to the analytics user interface 118. The analytics user interface 118 may display the first results to the user and allow the user to determine whether further analysis should be done on the master data. For example, the user may determine that a data mining operation should be performed on the master data. The user may then send a request to the computing platform 140 to perform further analytical operations on the master data.

After the computing platform performs an analytical operation on the master data, the results may be transferred back to the analytics user interface 118 and displayed to the user. The second results may show correlations that were previously unknown. The correlations may be represented by data. Business metadata and technical metadata may also be associated with the data and describe the data. As shown in FIG. 3, the analytics user interface 118 contains a business extender 120. The business extender 120 may transfer the business metadata to the business metadata repository 302 and the technical metadata to the technical metadata repository 304, in the metadata repository 128. As discussed herein, business metadata may add value to a business term. This value can further define a business term and can also create new business terms. The business extender 120 may update the glossary on the user interface 114 with the new definitions or new business terms to reflect the addition of the business metadata.

Figure 4:
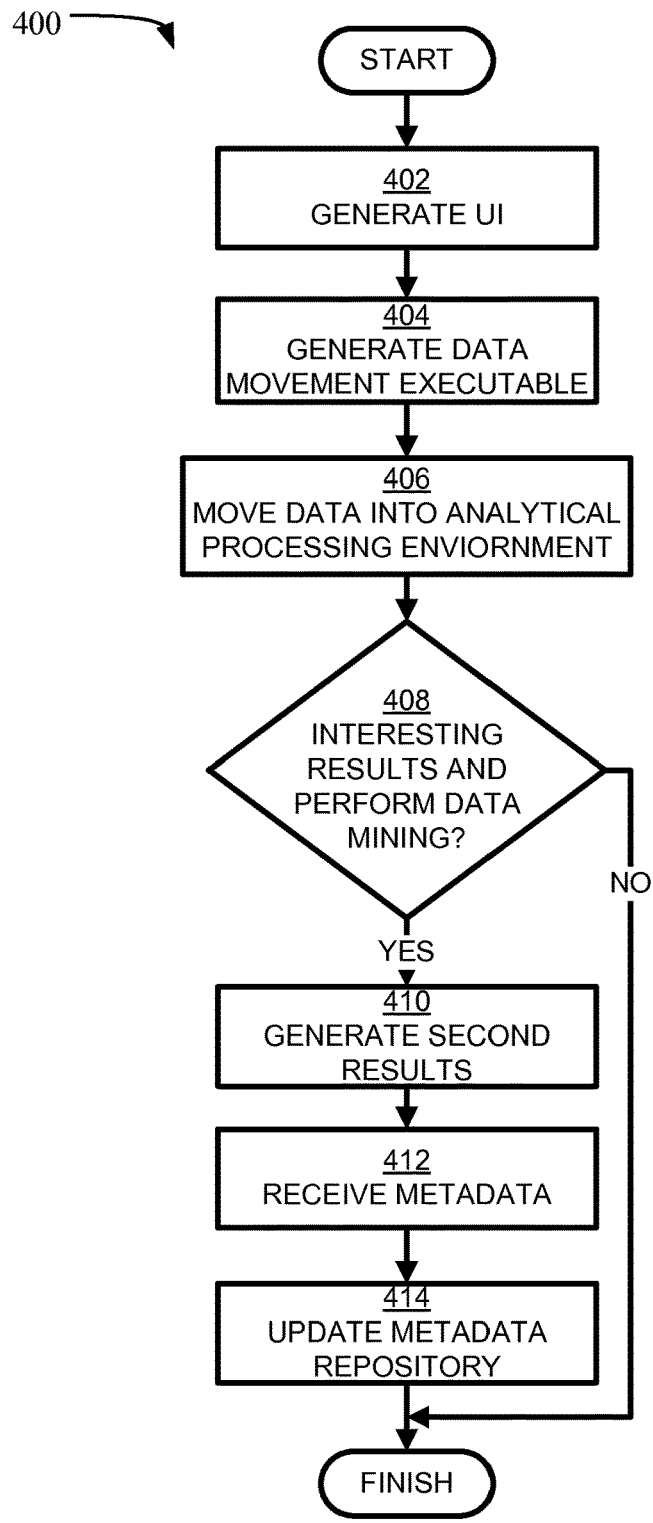
FIG. 4 depicts a process for analyzing a query and provisioning data to analytics, consistent with embodiments of the present disclosure.

FIG. 4 depicts a process 400 for analyzing a query and provisioning data to analytics, consistent with embodiments of the present disclosure. In operation 402, a user interface may be generated. The user interface may display a set of selectable terms from a glossary. The selectable terms may include business terms such as customer segments and product segments. The glossary may also include a list of analytical operations and a list of social media sources that may also be selected. Furthermore, the user interface may also display a set of linking-terms that may be selected to tie the business terms, analytical operations, and social media sources together. A business metadata query may be formed by selecting business terms, analytical operations, social media sources, and linking-terms from the user interface.

Illustratively, in operation 404, a data movement executable may be generated from the business metadata query. The data movement executable may identify forums based on the selected social media sources. The data movement executable may also identify an analytical processing environment. Furthermore, the business metadata query may be sent to the database manager (e.g. database manager 136). The database manager may then retrieve the master data from the database (e.g. database 138) and place the master data in the analytical processing environment.

In operation 406, the data movement executable may use the master data to locate the correct data on the forums and move the data from the forums into the analytical processing environment, where analytics may performed on the data. Results from the performance may then be sent to an analytical user interface.

In operation 408, the user may determine whether the results reveal interesting characteristics and determine whether to perform further analytics on the master data. In an embodiment, association correlation mining may be done on the master data. An association correlation may determine if customers buying one product also buy a lot of another product. An enterprise may then be able to use strategic marketing for products meeting an association correlation threshold value with products that customers have purchased. If the user finds that the first results revealed interesting characteristics and determined further analytics are necessary, the process may proceed to operation 410.

Illustratively, in operation 410, after the performance of further analytics on the master data, second results may be generated. The second results may show correlations that were previously unknown. The correlations may be represented by data. Business metadata and technical metadata may also be associated with the data and describe the data. In operation 412 the business metadata and technical metadata may be received by the analytics user interface. A business extender (e.g. business extender 120) may be included in the analytics user interface and may update a metadata repository by transferring the business metadata and the technical metadata to the metadata repository. As discussed herein, business metadata may add value to a business term. This value may further define a business term and may also create new business terms. The business extender may update the glossary on the user interface with the further defined business terms or new business terms to reflect the addition of the business metadata.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for analyzing a query and provisioning data to analytics, the method comprising:
   generating a user interface that displays a set of selectable terms from a glossary of business terms;
   generating, in response to a selection of a subset of the set of selectable terms, a business metadata query that identifies at least one forum with a plurality of member profiles;
   generating, by a generator, at least one data movement executable from the business metadata query that identifies the at least one forum and an analytical processing environment;
   moving, by a computing platform, data from the at least one forum into the analytical processing environment by deploying the at least one data movement executable;
   performing, by the computing platform, using the analytical processing environment, analytical operations on the data from the at least one forum, by performing association correlation mining on the data from the at least one forum;
   identifying, by a business extender, metadata from a result of the analytical operations; and
   updating, by the business extender the glossary of business terms using the identified metadata.

2. The method of claim 1, wherein generating the at least one data movement executable comprises:
   analyzing technical metadata associated with business metadata to identify a scope of the business metadata query; and
   analyzing the business metadata query to identify at least one data source, the analytical operations, and the analytical processing environment.

3. The method of claim 1, wherein deploying the at least one data movement executable by the computing platform comprises:
   reading data from at least one data source;
   receiving data records from the at least one data source based on the data read; and
   sending the data records to the analytical environment.

4. The method of claim 1, wherein the set of selectable terms include a customer segment, a product segment, a social media source, and an analytical operation.

5. The method of claim 1, further comprising:
   receiving, by the computing platform results in response to the performance of the analytical operations on the data; and
   sending, by the computing platform, the results to an analytical user interface.

6. The method of claim 1, wherein updating the glossary of business terms includes adding, by the business extender new business terms to the glossary of business terms.

7. The method of claim 1, wherein updating the glossary of business terms includes further defining, by the business extender, a set of business terms in the glossary of business terms.

* * * * *